July 19, 1960    I. M. BROWN ET AL    2,945,302
MASON'S GUIDE AND LINE HOLDING APPARATUS
Filed Dec. 6, 1957    5 Sheets-Sheet 1

INVENTORS
IRA M. BROWN,
ALTON R. BROWN,
BY
McMorrow, Berman + Davidson
ATTORNEYS.

July 19, 1960

I. M. BROWN ET AL 2,945,302

MASON'S GUIDE AND LINE HOLDING APPARATUS

Filed Dec. 6, 1957

INVENTORS
IRA M. BROWN,
ALTON R. BROWN,
BY

*McMorrow, Berman & Davidson*
ATTORNEYS.

July 19, 1960
I. M. BROWN ET AL
2,945,302
MASON'S GUIDE AND LINE HOLDING APPARATUS
Filed Dec. 6, 1957
5 Sheets-Sheet 3
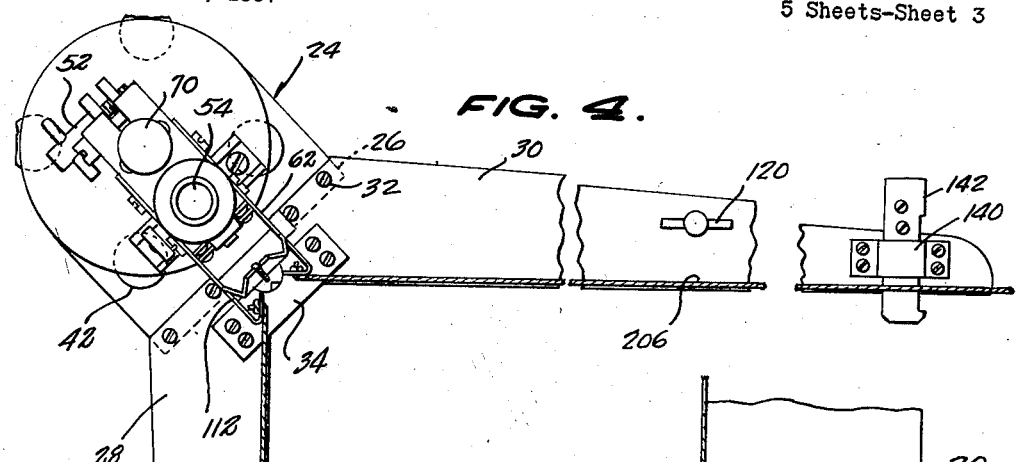
FIG. 4.
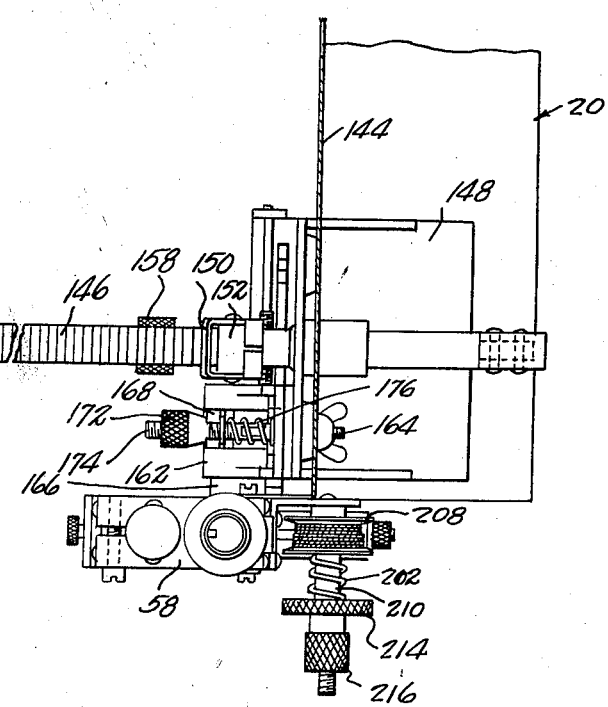
FIG. 12.
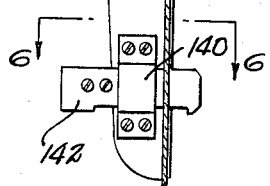
INVENTORS
IRA M. BROWN,
ALTON R. BROWN,
BY
McMorrow, Berman + Davidson
ATTORNEYS.

July 19, 1960   I. M. BROWN ET AL   2,945,302
MASON'S GUIDE AND LINE HOLDING APPARATUS
Filed Dec. 6, 1957   5 Sheets-Sheet 4
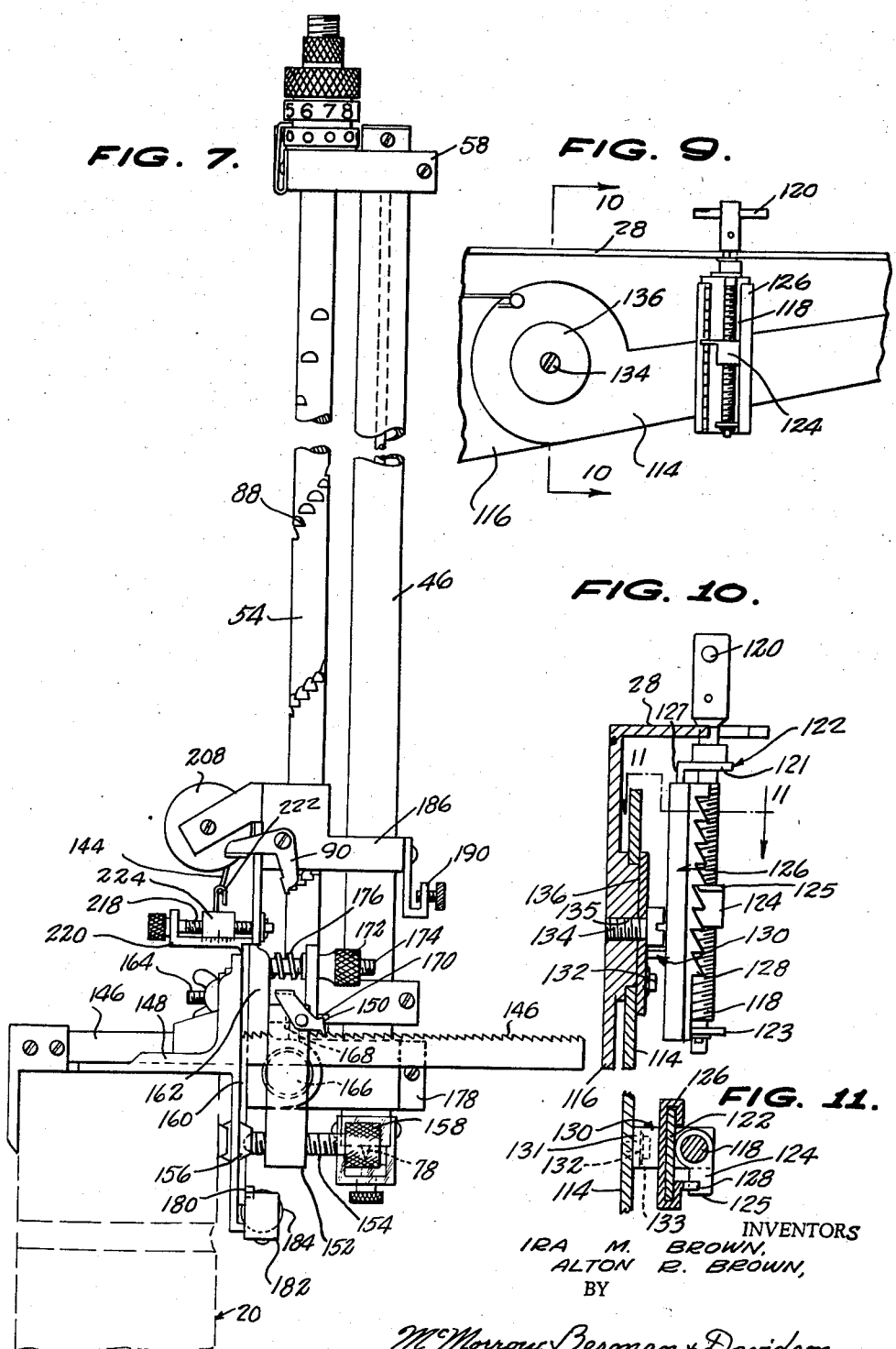
INVENTORS
IRA M. BROWN,
ALTON R. BROWN,
BY
McMorrow, Berman & Davidson
ATTORNEYS.

July 19, 1960     I. M. BROWN ET AL     2,945,302
MASON'S GUIDE AND LINE HOLDING APPARATUS
Filed Dec. 6, 1957     5 Sheets-Sheet 5
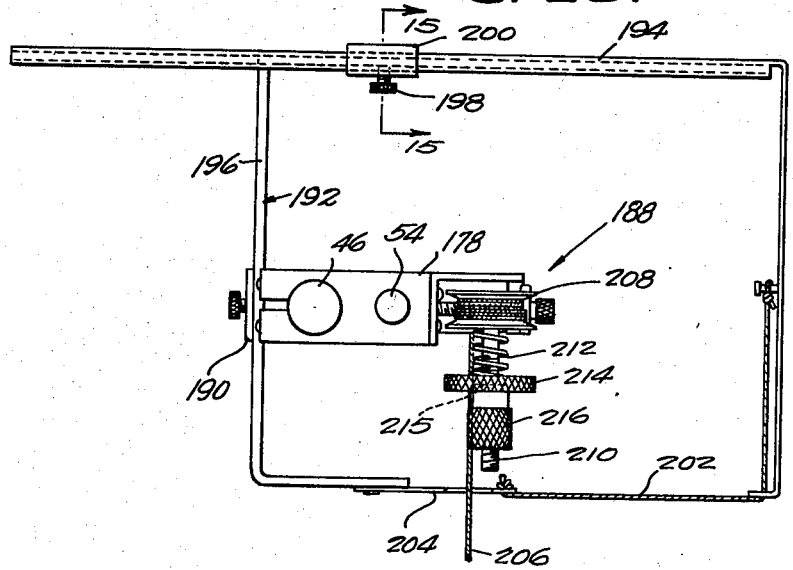
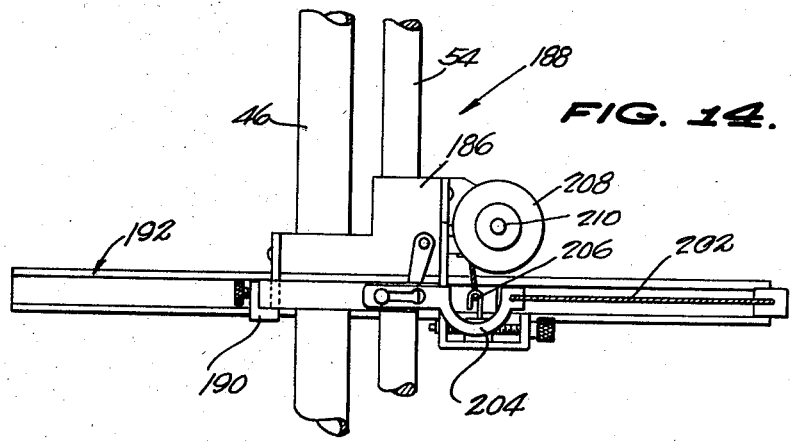
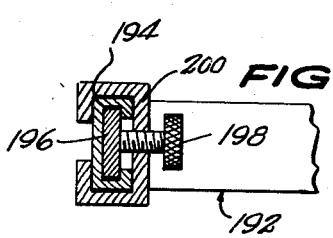
INVENTORS
IRA M. BROWN,
ALTON R. BROWN,
BY
*McMorrow, Berman & Davidson*
ATTORNEYS.

United States Patent Office 2,945,302
Patented July 19, 1960

2,945,302
MASON'S GUIDE AND LINE HOLDING APPARATUS

Ira M. Brown, P.O. Box 247, and Alton R. Brown, P.O. Box 222, both of St. Simons Island, Ga.

Filed Dec. 6, 1957, Ser. No. 701,027

4 Claims. (Cl. 33—85)

The present invention relates to a mason's guide and line holding apparatus.

An object of the present invention is to provide a mason's guide and line holding apparatus which enables a mason to erect building walls of building blocks in vertical and horizontal accurate dimensions.

Another object of the present invention is to provide a mason's guide and line holding apparatus which is easily and quickly adjusted, one sturdy in construction and of simple structure, and one which is economically feasible.

These and other objects and advantages of the present invention will be fully apparent from the following description when taken in connection with the annexed drawings, in which:

Figure 4 is a plan view of the assembly shown in Figure 2 with a portion of one anchoring means broken away;

Figure 5 is a sectional view taken on the line 5—5 of Figure 2;

Figure 6 is a sectional view, on an enlarged scale, taken on the line 6—6 of Figure 4;

Figure 7 is an elevational view of another portion of the invention shown in Figure 1;

Figure 9 is a fragmentary elevational view of a portion of the assembly shown in Figure 4;

Figure 10 is a sectional view, on an enlarged scale, taken on the line 10—10 of Figure 9;

Figure 11 is a sectional view taken on the line 11—11 of Figure 10;

Figure 12 is a plan view of the assembly shown in Figure 7;

Figure 13 is a plan view of another portion of the assembly shown in Figure 1;

Figure 14 is a fragmentary elevational view of the assembly shown in Figure 13; and Figure 15 is a sectional view, on an enlarged scale, taken on the line 15—15 of Figure 13.

Figure 1:
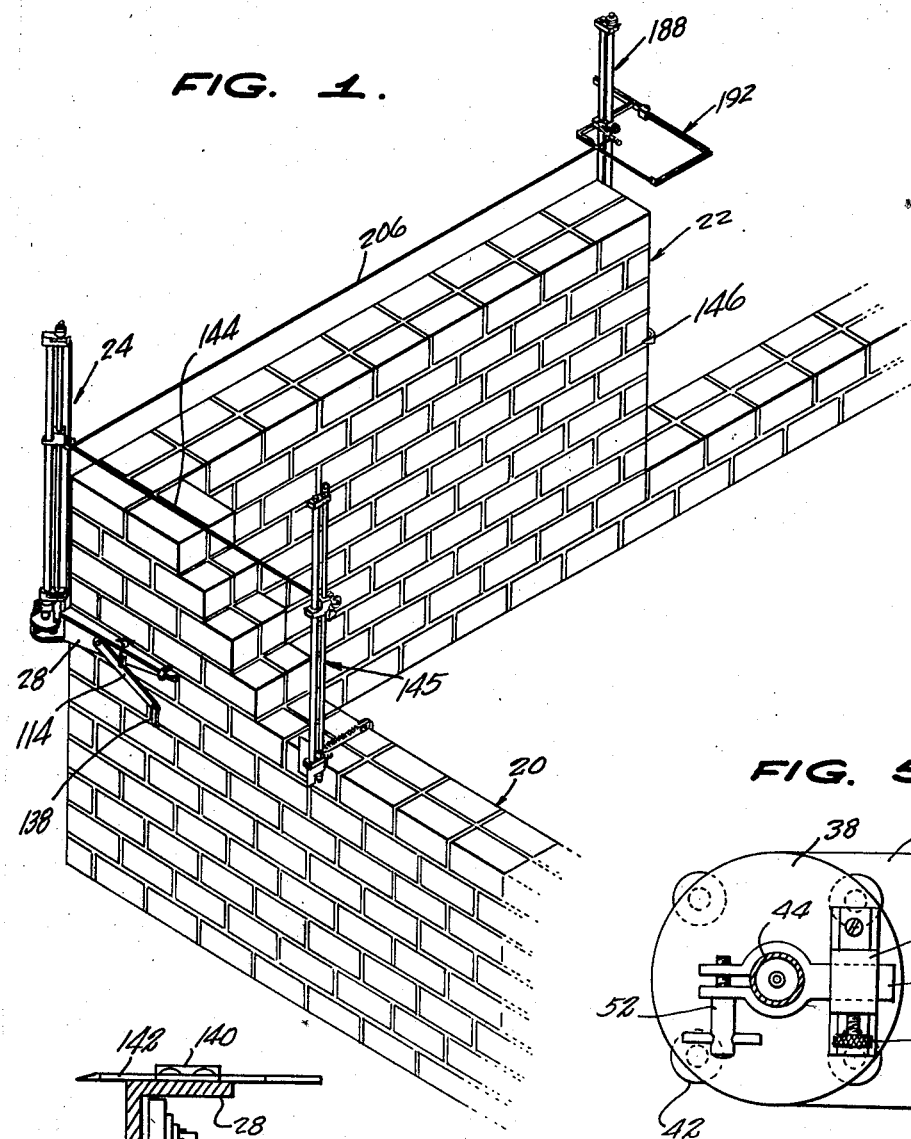
Figure 1 is an isometric view of a building wall at the corner thereof with the apparatus of the present invention installed thereon.

Referring in greater detail to the drawings in which like numerals indicate like parts throughout the several views, the reference numerals 20 and 22 represent two sections of a building wall at the corner thereof and a first component of the present invention is shown in Figure 1 and designated by the reference numeral 24.

Figure 2:
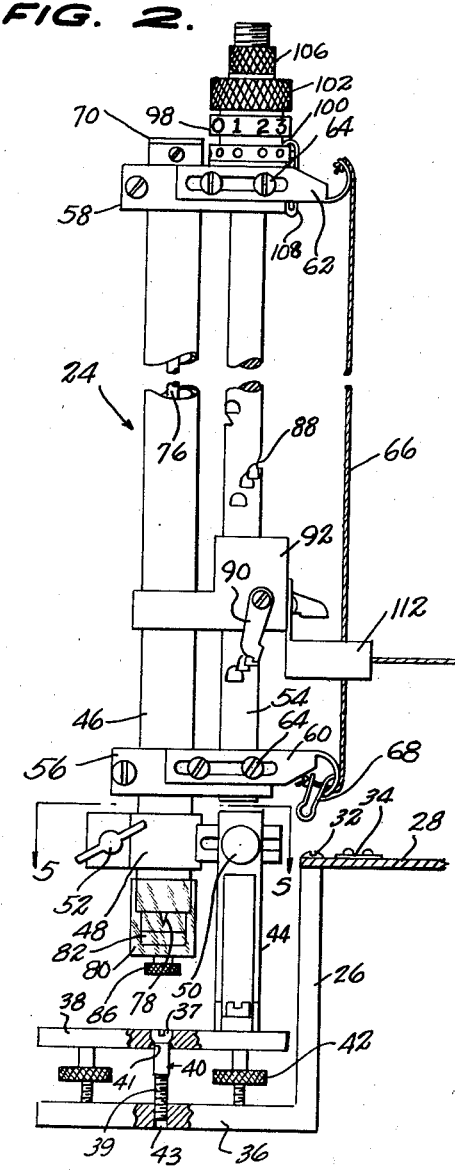
Figure 2 is an elevational view of a portion of the apparatus shown in Figure 1.
Figure 3:
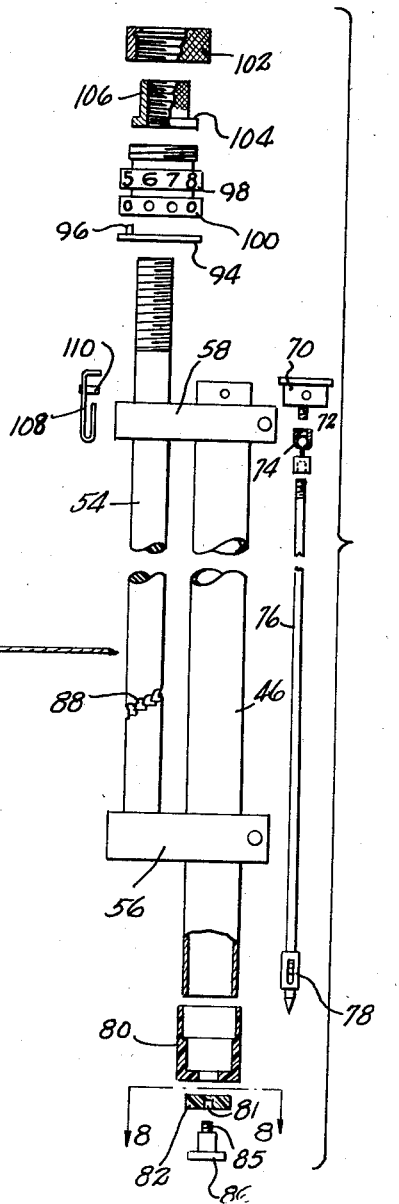
Figure 3 is an exploded view of a portion of the assembly shown in Figure 2.

The apparatus component 24 is shown in detail in Figures 2 to 4 and comprises a vertical base 26 having a pair of horizontally disposed elongated plates 28 and 30 arranged at a right angle with respect to each other, the plate projecting from one side of the base 26 adjacent the upper end of the latter. Bolts 32 secure the plates 28 and 30 to the upper end of the base 26. A short plate 34 is bolted to the top of the plates 28 and 30 and extends across the gap between their adjacent ends, the plate 34 being remote from the base 26 and forming a coplanar portion of the plates 28 and 30 and adapted to extend over and rest upon the corner of the walls 20—22.

The portions of the plates 28 and 30 remote from the plate 34 are adapted to extend exteriorly along, as anchoring means for the apparatus, and engage each of the walls 20 and 22 when the plate 34 is mounted upon the corner of such walls.

A ledge 36 projects from the other side of the vertical base 26 adjacent the lower end of the latter.

A table 38 is superimposed upon and spaced from the ledge 36 and is connected to the ledge 36 for tilting movement about a vertical axis. Means is operatively connected to the table 38 and to the ledge 36 for holding the table 38 in a selected position of its tilting movement. This means includes a centrally disposed retaining bolt 40, Figure 2, having a head 37 on one end and a threaded portion 39 extending inwardly from the other end and terminating at a point spaced from the head 37. The bolt head 37 of the bolt 40 is loosely received in a countersunk hole 41 provided in the table 38 with a threaded portion 39 of the bolt 40 in threaded engagement with a threaded bore 43 provided in the ledge 36. A plurality of leveling screws 42 are interposed between the ledge 36 and the table 38 and are spaced about the bolt 40, the upper ends of the screws 42 bearing against the under side of the table 38 and the lower ends of the screws 42 are each threadedly received in a threaded bore, not shown, formed in the ledge 36. The tilting movement of the table 38 is accomplished by manually rotating opposed ones of the leveling screws 42 into and out of the ledge 36 in the conventional manner.

A post 44 is fixedly carried by the table 38 and a hollow standard 46 is arranged in vertical spaced relation with respect to the post 44. A transversely disposed support element 48 extends slidably through the upper end of the post 44 and is adjustably secured therein by means of a securing member or thumb screw 50, as shown in Figure 5. The end of the support element 48 remote from the post 44 is split and provided with a wrench 52 for tightening it about the standard 46 in any position of rotary movement of the standard 46 within the support element 48.

An upstanding guide rod 54 is positioned adjacent the standard 46 and is supported in fixed spaced relation with respect to the standard 46 and connected for movement with the standard 46 by means of a lower support member 56 and an upper support member 58. Secured to each of the support members 56 and 58 is a line holder 60 and 62, respectively, each being secured by screws 64 to the support members 56 and 58 for selective positioning toward and away from the guide rod 54. A plumb line 66 extends between the holders 60 and 62 and is carried thereby. A spring clip 68 maintains tension in the plumb line 66, as shown most clearly in Figure 2.

Figure 8:
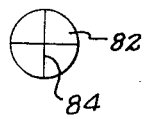
Figure 8 is a sectional view, on an enlarged scale, taken on the line 8—8 of Figure 3.

The standard 46 is hollow and closed at its upper end by a cap 70 having a stud 72 depending therefrom to which is secured a ball and socket joint member 74. A rigid rod 76 has its upper end threaded and threadedly connected in the ball and socket member 74 for free swinging movement within the standard 46. The lower end of the rod 76 carries a pointer element 78 which is visible through a transparent plastic cup 80 carried on the lower end of the standard 46. A disc 82 having plumb lines 84, Figure 8, inscribed thereon is positioned within the cup 80 so that the plumb lines 84 cooperate with the pointer element 78 to indicate when the standard 46 is in a truly vertical position. The underside of the disc 82 is provided with a threaded bore 81 receiving the threaded end portion 85 of a thumb bolt 86, Figures 2 and 7, thereby removably securing the disc 82 in the cup 80. In Figure 3, the disc 82 and thumb bolt 86 are shown detached from the cup 80.

The guide rod 54 is provided with a plurality of notches 88 arranged in stepped relation about the rod 54, the notches 88 receiving a pawl 90 pivotally mounted upon a gauge block or gauge 92 slidably connected to the standard 46 and the guide rod 54. The notches 88 are arranged in increments of a sixteenth of an inch more or less, as desired, and represent building block course lines or marks for various thicknesses of mortar used with building block of various types. The guide rod 54 is rotatable so as to bring one or another series of notches 88 into registry with the pawl 90. The portion of the guide rod 54 adjacent the upper end is threaded and also provided with a longitudinally arranged groove (not shown) receiving a projection on the inner periphery of a washer 94 for securing such washer 94 against rotary movement relative to the guide rod 54.

A peg 96 projects upwardly from the washer 94 and is received in a hole provided on the underside of an indicating collar 98. The collar 98 is provided with indicia and also with detent recesses 100 formed in its periphery adjacent the lower end thereof. The peg 96 and the cooperating groove in the guide bar 54 and the projection on the washer 94 serve as a means to detachably secure the collar 98 to the guide rod 54. A knurled nut 102 is threadedly engaged with external threads on the upper end of the collar 98 and is circumposed about a shoulder 104 provided on a locking nut 106. The guide rod 54 may be rotated by turning the collar 98 to bring any selected series of notches 88 into the path of movement of the pawl 90. Nut 102 may be loosened and nut 106 rotated to either the right or left to raise or lower the guide rod 54, including the gauge 92 with the pawl 90 resting in a selected notch 88.

The notches 88 and the pawl 90 provide releasable latch means on the gauge 92 and standard for holding the gauge 92 in the selected position of its up and down movement relative to the standard.

A spring clip 108 secured to the upper support member 58 behind the line holder 62 (Figure 2) has a leg 110 projecting therefrom resiliently receivable within one of the recesses 100 when the collar 98 has been turned to put in registry one series of notches 88 with the pawl 90. The clip 108 is shown most clearly in Figure 3.

In Figure 4, the reference numeral 112 represents the line holder mounted on each side of the gauge 92 for upward and downward movement therewith.

Means is provided on each of the plates 28 and 30, constituting anchoring means, for securing them to the partially finished building wall, as shown in Figure 1. This means consists in an arm 114 pivotally connected adjacent one end to the depending web 116 of each plate 28 and 30. The anchoring means on both of the plates 28 and 30 are identical and will be described with reference to the anchoring means on the plate 28. This structure is shown most clearly in Figures 6, 9, 10, and 11. A bolt 118 having a handle 120 on its upper end is rotatably mounted adjacent its upper end in the plate 28. The portion of the bolt 118 below the plate 28 extends through the legs 121 and 123 of a U-shaped bracket 122. A pawl 124 is threadedly engaged on the bolt 118 between the legs 121 and 123 and moves upwardly and downwardly responsive to the rotation of the bolt 118. A slide member is slidably mounted on the bight 127 of the bracket 122 and has a notched flange 128 projecting from one edge of the member 126, a notch of the flange 128 being engaged by a tooth 125 on the pawl 124, as shown in Figures 10 and 11.

An angle-shaped extension 130 has the horizontal leg 131 secured to the slide member 126, and has the vertical leg 133 below the leg 131, the leg 133, as shown in dotted lines in Figure 11, being provided with an opening. The vertical leg 133 of the extension 130 is secured to the arm 114 by means of a pin 132 extending through said opening, the pin 132 being shown in full lines in Figure 10 and in dotted lines in Figure 11. The arm 114 is pivotally mounted on the web 116 of the plate 28 by means of a bolt 134 and washer 136, the bolt 134 being threadedly received in the threaded bore 135 provided in the web 116. Upon manual rotation of the bolt 118 the pawl 124 is correspondingly moved, resulting in pivotal movement of the arm 114 about the bolt 134 as an axis.

The free end of the arm 114 carries a hook 138 (Figure 6) for insertion under a brick of a course of bricks or other building block, as shown in Figure 1, when the invention component 24 is installed upon the corner of a building wall. Slidably mounted under a plate member 140 on the free end portion of the plate 28 is a support element 142 of a length to extend over or at least partially over the course of brick or other building block and to be embedded in the mortar as the building wall is erected in succeeding courses.

In Figure 1, two other upright components of the present invention are shown for supporting the mason's line 144 at points along the walls 20 and 22 remote from the corner of such walls. One of such components, designated generally by the reference numeral 145 is shown in detail in Figures 7 and 12. The same hollow standard 46 and the solid guide rod 54 are used with other means for supporting the latter in an upright condition on the wall 20. This means includes a clamp bar 146 (Figure 7) which extends through a base member 148 and is clamped on the wall 20 by means of a pawl 150 engageable in teeth provided on the clamp bar 146. The pawl 150 is of U-shaped configuration, as shown in Figure 12, and is mounted upon the sides of an upright block 152 the upper end face of which is shown in Figure 12 in full lines. The block 152 is shown in dotted lines in Figure 7 with the threaded shank portion of a bolt 154 also shown in dotted lines traversing the lower end portion of the block 152 and having one end bearing against an abutment 156 provided on the depending portion of the base member 148. The knurled head of the bolt 154 is shown in Figure 12 and designated by the reference numeral 158.

An upstanding positioning plate 160 is arranged in face to face relation with the upright face of the base member 148. An upright support 162 is in face to face abutting relation with the opposite face of the plate 160 and is secured to the base member 148 by means of a bolt and wing nut assembly 164. A stub shaft 166 has a portion adjacent one end thereof projecting through the arms of the support 162, such arms being separated and providing a space for a ring clamp element 168 circumposed about the shaft 166 and secured thereon by means of a cap screw 170, as shown in Figure 7. One leg of the ring clamp element 168 extends vertically and is movable toward and away from the support 162 by means of a knurled nut 172 threadedly engaged on a bolt 174 with a spring 176 biasing the attached shaft 166 for rotary movement in the clockwise direction, as viewed in Figure 7.

A support 178 is positioned above the lower end of the standard 46 and receives therein the lower end portion of the standard 46. The support 178 is secured on the projecting end portion of the shaft 166.

Means is provided for tilting the plate 160 when the bolt and wing nut assembly 164 is loosened freeing the support 162 from the plate 160. This means consists in a lug 180 projecting from the face of the plate 160 below the support 162 and engageable in a notch provided in a horizontally disposed carriage 182 positioned adjacent the lower end of the base member 148, the lug 180 received in a notch of the carriage 182 constituting means connecting the plate 160 to the carriage 182 for movement therewith. A horizontally disposed bolt, only the head 184 which is shown in Figure 7 is supported for rotation in the lower end portion of the base member 148 and is threadedly engaged by the carriage 182. Manual rotation of the bolt head 184 effects back-and-forth movement of the carrage 182 relative to the base member 148, resulting in tilting movement of the plate 160. The tilting movement of the plate 160 is used to adjust the vertical position of the standard 46 in one direction and the tightening or loosening of the nut 172 on the bolt 174 is used to correct the vertical position of the standard 46 in the other direction. The upper support member 58 connects the standard 46 to the guide rod 54 as heretofore described with reference to the invention component 24. The same structure of the notches 88 and the means for positioning the notches 88 relative to the pawl 90 on the line holder 186 is used with the aforesaid line holder 112.

Means is provided for holding a mason's line on the other wall 22, such means taking the form of another component 188 which includes all of the elements above described with reference to the component 145 mounted upon the wall 20.

As shown in Figure 1, the component 188 is mounted upon the end of a section adjacent a window or door opening and is so mounted that the base member is on the vertical portion of the jamb or door opening with only the free end of the clamp bar 146 showing and engaging one side of the wall 22. Referring again to Figure 7, the line holder 186 is seen to have an upturned clamping member 190 utilized for the support of a horizontally disposed open frame 192 shown in Figures 13 to 15. The frame 192 includes an outer C-shaped arm 194 and an inner arm 196 telescopically arranged together and adjustably secured together by means of a bolt 198 threaded into one side of a clamping member 200, as shown in Figure 15, pressing the arm 196 against the arm 194. The free ends of the arms 194 and 196 are connected together by a cord link 202 and a U-shaped metal strip 204 which permits the mason's line 206 to be positioned at the same level as the cord link 202 without interference therewith.

Means is provided on each of the line holders 186 for supporting a reel of the mason's line to be used. This means consists in a reel 208 mounted upon a stub shaft 210 having a spring 212 circumposed thereabout. The spring 212 has one end anchored in the reel 208 and the other end anchored in a knurled nut 214 mounted on a reduced portion (not shown) of the shaft 210. A C-washer (shown in dotted lines in Figure 13) is received on the bolt 210 adjacent the undercut one face of the nut 214 and holds the nut 214 against the partially compressed spring 212. Another nut 216 having a counter bore (not shown) large enough to receive the washer 215 is threaded on the bolt 210 and may be tightened against the nut 214 to bind the same against the larger portion of the bolt 210. When the nut 216 is loosened, tension on the reel 208 is released and the mason's line 206 may be unreeled therefrom. Means is provided for accurately positioning the mason's line 144 or 206 relative to the wall to be constructed. Specifically, this means consists in a bolt 218 rotatably supported in a bracket 220 dependingly carried on the line holder 186. An inverted hook 222 is carried upon a block 224 threadedly mounted upon the bolt 218 for movement toward and away from the guide rod 54.

Referring again to Figure 4, it will be seen that the plate 30 is provided on its free end with the plate member 140 and the slidable support element 142 for supporting the plate 30 in the horizontal position upon the partly finished wall 22. The plate 30 is also provided with the same anchoring means including an arm 114 and the building block engaging means carried by the arm 114.

In use, the components of the invention are erected on the partially completed wall or upon the foundation for such wall with the guide rod 54 and the standard 46 in the vertical position. This is accomplished by adjustment of the associated support, in the case of the invention component 24, this being the adjustment of the table 38 relative to the ledge 36. The adjustment of the standard 46 and the guide rod 54 of the other components is accomplished by adjustment of the side leveling carriage 182 and the rocking of the shaft 166 about the horizontal axis. The thumb bolt 86 is loosely seated within the bottom of the cup 80 so that the disc 82 may be raised into engagement with the pointer element 78 to stop the swinging of the latter in order that the pointer element 78 and the attached rod 76 come to rest as quickly as possible while the vertical adjustment of the standard 46 is made.

With the standard 46 and the associated guide rod 54 in the vertical position, in each of the components, the guide rod 54 is turned to present to the pawl 90 the desired series of notches 88 for the particular type of building block being used and the desired thickness of motar to be used between such block. The mason's line is then stretched between the line holders and the hooks associated with the gauges or line holders 186. The blocks 224 are adjusted inwardly or outwardly and the gauge 92 shifted until the lines 144 and 206 are in the proper position relative to the walls to be constructed. After a course is laid, each gauge and the holder is raised to engage the pawl 90 in the next notch 88.

When the line holder has been raised as far as it is possible on each standard 46, the line supports are removed from the wall and mortar is placed in the space left by the removal of the plate 34 and the removal of the projecting end portions of the support elements 142. The line supports are then placed again on the wall and the operation is repeated.

While only a preferred embodiment of the present invention has been shown and described, other embodiments are contemplated and numerous changes and modifications may be made therein without departing from the spirit of the invention as set forth in the appended claims.

What is claimed is:

1. In a mason's guide and line holding apparatus, a vertical base adapted to be positioned exteriorly of and adjacent to a corner of a partially erected building wall, a horizontally disposed plate projecting from one side of said base adjacent the upper end thereof and adapted to have a portion remote from said base to extend over and rest upon the corner of said wall, an anchoring means embodying a pair of horizontally disposed elongated plates arranged at a right angle with respect to each other positioned below and attached to said horizontally disposed plate and each adapted to extend exteriorly along and engage each of the meeting walls of said corner when said base has been mounted adjacent said corner, a ledge projecting from the other side of said base adjacent the lower end thereof, a table superimposed upon and spaced from said ledge and connected to said ledge for tilting movement about a vertical axis, means operatively connected to said table and ledge for holding said table in a selected position of its tilting movement, a post fixedly carried by said table, a transversely disposed support element extending slidably through the upper end of said post and adjustably secured to said post, a standard arranged in vertical spaced relation with respect to said post and supported within said support element for rotary movement, a securing member carried by said support element and engageable with said standard for holding said standard in any position of its rotary movement within said support element, a building block gauge mounted on said standard for up an down movement, a guide rod secured to said standard, and releasable latch means on said gauge and guide rod for holding said gauge in a selected position of its up and down movement.

2. In a mason's guide and line holding apparatus, a vertical base adapted to be positioned exteriorly of and adjacent to a corner of a partially erected building wall, a horizontally disposed plate projecting from one side of said base adjacent the upper end thereof adapted to have a portion remote from said base to extend over and rest upon the corner of said wall, an anchoring means embodying a pair of horizontally disposed elongated plates arranged at a right angle with respect to each other positioned below and attached to said horizontally disposed plate and each adapted to extend exteriorly along and engage each of the meeting walls of said corner when said base has been mounted adjacent said corner, a ledge projecting from the other side of said base adjacent the lower end thereof, a table superimposed upon and spaced from said ledge and connected to said ledge for tilting movement about a vertical axis, means operatively connected to said table and ledge for holding said table in a selected position of its tilting movement, a post fixedly carried by said table, a transversely disposed support element extending slidably through the upper end of said post and adjustably secured to said post, a standard arranged in vertical spaced relation with respect to said post and supported within said support element for rotary movement, a securing member carried by said support element and engageable with said standard for holding said standard in any position of its rotary movement within said support element, a building block gauge mounted on said standard for up and down movement, a guide rod secured to said standard, releasable latch means on said gauge and guide rod for holding said gauge in a selected position of its up and down movement, a vertical support adapted to be fixedly anchored exteriorly of one of the meeting walls of said corner and spaced from said corner, a building block course gauge mounted on said support for up and down movement, means for holding said last mentioned gauge in a selected position of its movement, and a mason's line stretched between said gauges and carried thereby.

3. In a mason's guide and line holding apparatus, a vertical base adapted to be positioned exteriorly of and adjacent to a corner of a partially erected building wall, a horizontally disposed plate projecting from one side of said base adjacent the upper end thereof adapted to have a portion remote from said base to extend over and rest upon the corner of said wall, an anchoring means embodying a pair of horizontally disposed elongated plates arranged at a right angle with respect to each other positioned below and attached to said horizontally disposed plate and each adapted to extend exteriorly along and engage each of the meeting walls of said corner when said base has been mounted adjacent said corner, a ledge projecting from the other side of said base adjacent the lower end thereof, a table superimposed upon and spaced from said ledge and connected to said ledge for tilting movement about a vertical axis, means operatively connected to said table and ledge for holding said table in a selected position of its tilting movement, a post fixedly carried by said table, a transversely disposed support element extending slidably through the upper end of said post and adjustably secured to said post, said standard arranged in vertical spaced relation with respect to said post and supported within said support element for rotary movement, a securing member carried by said support element and engageable with said standard for holding said standard in any position of its rotary movement within said support element, a building block gauge mounted on said standard for up and down movement, a guide rod secured to said standard, releasable latch means on said gauge and guide rod for holding said gauge in a selected position of its up and down movement, a vertical support adapted to be fixedly anchored exteriorly of one of the meeting walls of said corner and spaced from said corner, a second building block course gauge mounted on said support for up and down movement, means for holding said second gauge in a selected position of its movement, a mason's line stretched between said first and second gauges and carried thereby, another vertical support adapted to be fixedly anchored exteriorly of the other of the meeting walls of said corner and spaced from said corner, a third building block course gauge mounted on said another support for up and down movement, means for holding said third gauge in a selected position of its movement, and a mason's line stretched between said first and third gauges and carried thereby.

4. In a mason's guide and line holding apparatus, a vertical base adapted to be positioned exteriorly of and adjacent to a corner of a partially erected building wall, a horizontally disposed plate projecting from one side of said base adjacent the upper end thereof adapted to have a portion remote from said base to extend over and rest upon the corner of said wall, an anchoring means embodying a pair of horizontally disposed elongated plates arranged at a right angle with respect to each other positioned below and attached to said horizontally disposed plate and each adapted to extend exteriorly along and engage each of the meeting walls of said corner when said base has been mounted adjacent said corner, a ledge projecting from the other side of said base adjacent the lower end thereof, a table superimposed upon and spaced from said ledge and connected to said ledge for tilting movement about a vertical axis, means operatively connected to said table and ledge for holding said table in a selected position of its tilting movement, a post fixedly carried by said table, a transversely disposed support element extending slidably through the upper end of said post and adjustably secured to said post, a standard arranged in vertical spaced relation with respect to said post and supported within said support element for rotary movement, a securing member carried by said support element and engageable with said standard for holding said standard in any position of its rotary movement within said support element, an upstanding guide rod positioned adjacent said standard and connected to said standard for movement with the latter, a building block course gauge mounted on said standard and said rod for up and down movement, a line holder mounted on said guide rod adjacent each end thereof, and a plumb line extending between said line holders and carried thereby.

References Cited in the file of this patent

UNITED STATES PATENTS

| | | |
|---|---|---|
| 713,789 | Newman | Nov. 18, 1902 |
| 1,112,935 | Rial et al. | Oct. 6, 1914 |
| 1,909,267 | Golt | May 16, 1933 |
| 2,761,214 | Ruble | Sept. 4, 1956 |

FOREIGN PATENTS

| | | |
|---|---|---|
| 312,754 | Italy | Nov. 24, 1933 |
| 943,409 | France | Oct. 4, 1948 |